Aug. 14, 1951 — R. L. GOODPASTURE — 2,564,477

GRASS AND WEED CUTTER

Filed Jan. 11, 1946

Inventor
Robert L. Goodpasture

By Wilfred E. Lawson
Attorney

Patented Aug. 14, 1951

2,564,477

UNITED STATES PATENT OFFICE 2,564,477

GRASS AND WEED CUTTER

Robert L. Goodpasture, Nashville, Tenn.

Application January 11, 1946, Serial No. 640,401

2 Claims. (Cl. 30—279)

This invention relates to a grass and weed cutter of a type embodying a double-edged cutting blade so that it may be swung or oscillated in a manner to effect the desired cutting, and it is a particular object of the invention to provide a flexible mounting for the cutting blade to increase momentum of the swing and thereby lessen the extent of the arm motion and also greatly reduce fatigue as the result of a reduction in the amount of energy necessary to efficiently operate.

It is also an object of the invention to provide a cutter of this kind including a cutting blade and a rigid handle, together with a flexible connection between the blade and handle and wherein such flexible connection is of a character to absorb shock when the cutting blade strikes some solid or stable substance, such as a stump, stick, or stone.

Furthermore, it is an object of the invention to provide a cutter of this kind employing a cutting blade that is concavo-convex in cross section at all points therealong, with the convex face disposed outwardly, such formation of the blade minimizing the liability of the blade digging into the ground as the implement is swung by the person and also to allow for the use of an extremely light and thin blade without sacrificing rigidity and strength.

The invention consists in the details of construction and in the combination and arrangement of the several parts of my improved grass and weed cutter whereby certain important advantages are attained, as will be hereinafter more fully set forth.

In order that my invention may be better understood, I will now proceed to describe the same with reference to the accompanying drawings, wherein.

Figure 2:
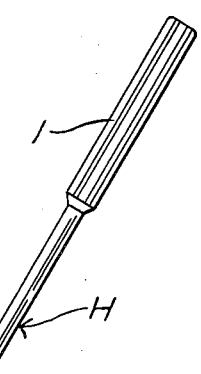
Figure 2 is a view in front elevation of the device as illustrated in Figure 1 but on a reduced scale.
Figure 1:
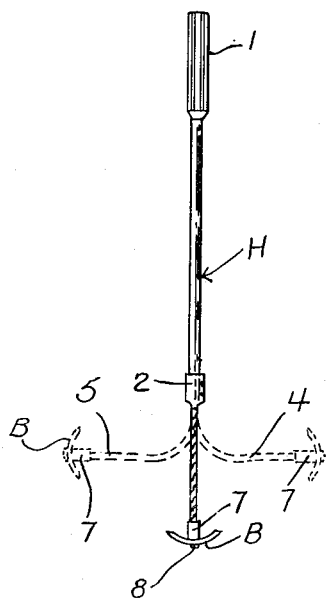
Figure 1 is a view in side elevation of a grass and weed cutter constructed in accordance with an embodiment of the invention.
Figure 3:
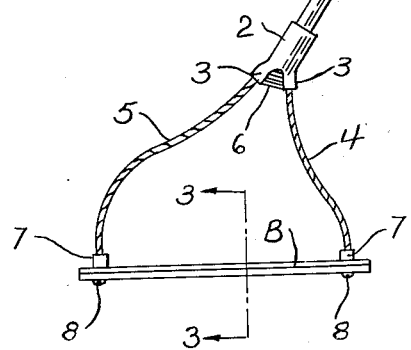
Figure 3 is an enlarged detail sectional view taken substantially on the line 3—3 of Figure 1.
Figure 3:
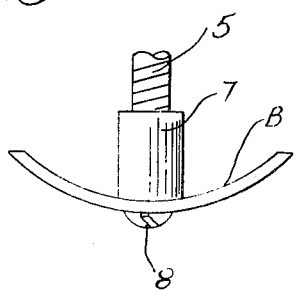

In the embodiment of the invention as illustrated in the accompanying drawings, H denotes a relatively long rigid handle shaft of desired length and material and which is provided at its outer extremity with a hand grip 1 of rubber or other preferred material. The opposite or forward end portion of the handle shaft H has rigidly mounted thereon a reinforcing sleeve 2 of steel or other preferred material and which is formed at its outer portion with the sockets 3 in which are effectively clamped the extremities of the flexible members 4 and 5. These extremities of the members 4 and 5, as herein embodied, are effectively held within the sockets 3 by intermediate compression, as at 6, of the outer portion of the socket member 3 between adjacent extremities of the flexible members 4 and 5. In other words, the sleeve 2 is initially a tubular body into one end of which the ends of the cables are inserted and by then mashing or compressing the sleeve between the cable ends as at 6, the sockets are produced with the cable ends firmly clamped therein.

These members 4 and 5 preferably constitute steel or wire rope cables or thongs possessing a certain degree of rigidity and resiliency to normally maintain the same in substantially a central position with respect to the handle shaft H or in substantially the same plane as the handle shaft H. These members 4 and 5, however, possess sufficient inherent flexibility to swing to either side of the handle shaft H during a working operation as the handle shaft H is swung either to the right or left, as indicated by broken lines in Figure 2 of the drawings.

The outer extremities of the members 4 and 5 are rigid within the socket member 7 securely held, as at 8, to the opposite end portions of an elongated cutting blade B straight along its longitudinal axis but concavo-convex in cross section from one end to the other. The socket members 7 are carried by the back or concave face of the blade B and are positioned at substantially the transverse center of the blade.

The member 5 is of a length greater than that of the member 4 and said members 4 and 5 are so initially flexed in a direction lengthwise of the blade B to maintain the handle shaft H to one side of the longitudinal center of the blade B and substantially at an angle of 45°. The invention, however, is not to be limited to any particular degree of angularity.

The handle shaft H is preferably tubular and of aluminum and of a length considerably in excess of the lengths of the members 4 and 5 so that, in operation, the full power of the swing of the rigid handle shaft H will be fully transmitted to the blade B and on account of the flexibility of the members 4 and 5, such power will be accentuated and increased. This is of advantage as in operation effective cutting by the blade B will be had upon a very short stroke of the handle shaft H and, therefore, the device can be used to advantage between plants and in corners and other places where there would not be sufficient space for a long swing.

Furthermore, it is to be pointed out that the members 4 and 5 will readily absorb shock when the blade B, during a working operation, comes into contact with some solid or stable substance, such as a stump, stick, or stone.

It is to be noted that the longitudinal or cutting edges of the blade B are straight from end to end or parallel, coplanar, and free of teeth, corrugations or other obstructions, and it is believed to be readily apparent that by having the blade B concavo-convex in cross section from one end to the other and with the convex face outwardly disposed, the liability of the cutting edges of the blade digging into the ground is substantially eliminated.

With the implement as herein set forth, it is to be pointed out that the actual cutting takes place as the blade B reaches the lowest point in the circular swing and starts upward, thus cutting the grass and other vegetation on an upward slanting angle instead of directly across the vegetation.

It is also to be pointed out that by having the blade B transversely curved as hereinbefore set forth, it can be more easily sharpened than a flat blade.

From the foregoing description it is thought to be obvious that a grass and weed cutter constructed in accordance with my invention is particularly well adapted for use by reason of the convenience and facility with which it may be constructed and operated.

I claim:

1. A cutter of the character stated, comprising a relatively long handle shaft, a hand grip at one end thereof, a sleeve at the opposite end of said shaft, a pair of relatively long readily flexible cables each having an end disposed within the sleeve, said sleeve having a portion between the adjacent ends of the cables compressed to form spaced sockets in each of which an end of a cable is secured, said cables being of unequal length, a relatively long blade having opposite longitudinal edges sharpened, and a socket carried by the blade adjacent to each end, each of said sockets having an end of a cable secured therein.

2. A cutter of the character stated, comprising a relatively long handle shaft, a hand grip at one end thereof, a pair of relatively long freely flexible wire cables of unequal lengths, means securing each of the cables at one end to the end of the shaft remote from the hand grip, a relatively long blade having opposite longitudinal edges sharpened, and means carried by the blade adjacent to each end for securing the other ends of the cables to the blade.

ROBERT L. GOODPASTURE.

REFERENCES CITED

The following references are of record in the file of this patent:

UNITED STATES PATENTS

| Number | Name | Date |
| --- | --- | --- |
| 1,692,110 | Cave et al. | Nov. 20, 1928 |